United States Patent [19]
Decker et al.

[11] Patent Number: 6,001,945
[45] Date of Patent: Dec. 14, 1999

[54] HYPERBRANCHED POLYMERS CONTAINING SILICON ATOMS

[75] Inventors: Gary Thomas Decker; Daniel Graiver; Arthur James Tselepis, all of Midland, Mich.

[73] Assignee: Dow Corning Corporation, Midland, Mich.

[21] Appl. No.: 09/115,896

[22] Filed: Jul. 15, 1998

[51] Int. Cl.$^6$ ................................................ C08G 77/04
[52] U.S. Cl. .............................. 528/26; 528/38; 556/413; 556/436; 556/469
[58] Field of Search ................. 528/26, 38; 556/413, 556/436, 469

[56] References Cited

U.S. PATENT DOCUMENTS

| | | | |
|---|---|---|---|
| 4,468,492 | 8/1984 | Piccirilli et al. | 525/102 |
| 4,883,854 | 11/1989 | Coury | 528/28 |
| 5,174,813 | 12/1992 | Cifuentes | 106/3 |
| 5,290,901 | 3/1994 | Burns | 528/34 |

FOREIGN PATENT DOCUMENTS 02047371  2/1990  Japan .

OTHER PUBLICATIONS

Rev. Macromol. Chem. Phys., vol. C37(3), pp. 555–579, 1997.
Macromolecules, vol. 30, pp. 1890–1896, 1997.
Abstract 121, ACS Meeting, Aug, 1996.
Pure Appl. Chem., vol. A32 (11), pp. 1915–1930, 1995.
Journal of Inorganic and Organometallic Polymers, vol. 4, No. 1, pp. 61–77, 1994.
Journal of Inorganic and Organometallic Polymers, vol. 5, No. 1, pp. 43–59, 1995.
Macromol. Rapid Commun., vol. 18, pp. 253–260, 1997.
Pure Appl. Chem., vol. A33 (10), pp. 1399+, 1996.
Dedritic Macromol., vol. 2, pp. 101+, 1995.

*Primary Examiner*—Melvyn I. Marquis
*Assistant Examiner*—Mark W. Milstead
*Attorney, Agent, or Firm*—Jim L. DeCesare

[57] ABSTRACT

An exchange reaction of hydroxyl and alkoxysilane is used as a polymerization avenue yielding hyperbranched polymers. A monomer containing hydroxy alcohol functionality and alkoxy functionality attached to a silicon atom in the monomer is employed, and a simple exchange reaction with driving off of alcohol by-product leads to the desired hyperbranched polymerization and materials.

13 Claims, 4 Drawing Sheets

HYPERBRANCHED POLYMERS CONTAINING SILICON ATOMS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

This invention is directed to hyperbranched polymers, and more particularly to hyperbranched polymers containing silicon atoms.

BACKGROUND OF THE INVENTION

Recent developments in macromolecular architecture have led to progress in dendritic macromolecules including dendrimers and hyperbranched structures. These highly branched macromolecules are characterized by their non-linear structure, which prevents crystallization, and minimizes chain entanglements.

As a result, these macromolecules display an unusual viscosity profile and solubility behavior, when compared to high molecular weight typical linear polymers. Furthermore, unlike linear polymers, the number of functional end-groups in these highly branch macromolecules is directly proportional to their molecular weight.

Thus, the potential for high numbers of functional groups, and the overall globular nature of these types of materials are advantageous in applications related to surface activity, adhesion, rheology control, and cure.

Hyperbranched polymers, however, differ from dendrimers in their synthetic approach, and in the degree of regularity in their structure. As a result, hyperbranched polymers are much easier to make, but their molecular weight distribution at higher molecular weights approaches infinity, compared to dendrimers, which are made tediously one generation at a time, and often with several protection and unprotection steps, extensive purification steps; but the results are a molecular weight distribution close to unity.

Thus, hyperbranched polymers are more cost effective, and therefore are more suitable on a larger scale for most commercial applications.

All synthetic approaches to hyperbranched polymer up until now have been based on a divergent method, wherein a monomer having precisely two types of functional groups react one with the other, but do not react with themselves, and having an overall functionality that is greater than two. Most simple suitable monomers of this type contain a single A functional group and two B functional groups, i.e., an $AB_2$ type monomer.

Such a divergent method is represented in FIG. 1 of the accompanying drawing. According to this scenario, if the monomer has a higher number of functional groups, a more dense structure is possible. Thus, a monomer containing a single A functional group and three B functional groups, i.e., an $AB_3$ type monomer, it would lead to a higher branching density upon polymerization, and a higher concentration of the B functional group on the surface of the resulting polymer. In principle, therefore, $AB_X$ type polymers can be prepared wherein x can be any integer with a value greater than two.

Another key advantage of a hyperbranched polymer is the fact that the degree of branching can be controlled by increasing the free chain length between the functional groups. This alternative minimizes the crowding effect, and allows the production of higher molecular weight polymers.

Due to the large number of branches in such materials, the hydrodynamic volume of a hyperbranched polymer is smaller than that of a linear polymer of the same molar mass. This different relationship between the volume and molecular weight can be directly correlated with differences observed in viscosity, solubility, and other physical properties of hyperbranched polymers.

However, most hyperbranched polymers have been prepared by the polycondensation reaction of functional groups such as polyesters, ethers, and amides, with some hyperbranched polymers having been derived via C—C bonds. Some hyperbranched polymers have been prepared wherein a silane is used as a protective group during preparation of the monomer. For example, hyperbranched aromatic polycarbonates have been prepared by the polymerization of an $A_2B$ monomer derived from 1,1,1-tris(4-hydroxyphenyl) ethane $CH_3C(C_6H_4OH)_3$, in which one of the three phenol groups was protected by a trialkylsiloxy group, i.e., —OSi$(CH_3)_3$, in preparing the monomer, which was then removed prior to its polymerization.

Only relatively few hyperbranched polymers containing the silicon atom in their complex structure are known, and these materials are based on a hydrosilylation reaction of silanes and siloxanes containing vinyl and Si—H functionality, respectively. As a result, this particular type of hyperbranched polymer contains a carbosilane linkage, i.e., $\equiv$Si—$CH_2$—.

On the other hand, and in contrast, the present invention is directed to a new type of hyperbranched polymer having a basic structure containing an $\equiv$Si—O—C$\equiv$ linkage.

BRIEF SUMMARY OF THE INVENTION

The invention relates to a method of making a silicon atom containing hyperbranched polymer by polymerizing a derivatized aminofunctional organosilicon compound to yield a carbinol functional group.

In a first embodiment, the derivatized aminofunctional organosilicon compound is made by reacting an amine functional silane or an amine functional polysiloxane with a derivative of carbonic acid, such as ethylene carbonate or propylene carbonate, shown respectively below:

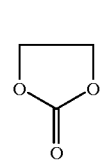 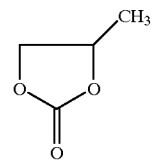

Ethylene Carbonate        Propylene Carbonate

Polymerization of the derivatized aminofunctional organosilicon compound proceeds by exchange of the alkoxy group with the carbinol functional group, whereby by-product alcohol is formed and is removed.

In a second embodiment, the derivatized aminofunctional organosilicon compound is made by reacting an amine functional silane or an amine functional polysiloxane with a cyclic lactone such as beta-propiolactone, gamma-butyrolactone, gamma-valerolactone, and gamma-caprolactone, shown respectively below:

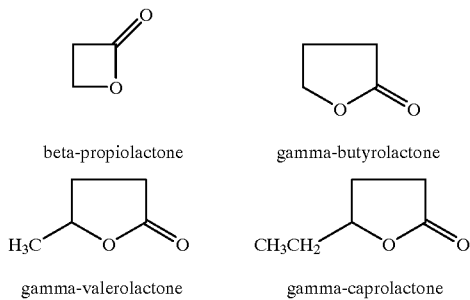

beta-propiolactone  gamma-butyrolactone gamma-valerolactone  gamma-caprolactone

Cyclic lactones having a closed-ring structure containing six members can also be employed, if desired, such as lactide or glycolide.

As previously noted, polymerization of the derivatized aminofunctional organosilicon compound proceeds by exchange of the alkoxy group with the carbinol functional group, whereby by-product alcohol is formed and is removed.

The invention also relates to hyperbranched polymers containing silicon atoms made by such methods.

Hyperbranched polymers according to this invention which are derived from a derivative of carbonic acid include units of the formula

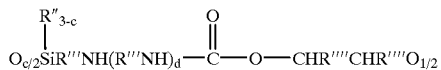

wherein R" is an alkyl group containing 1–4 carbon atoms such as methyl, ethyl, propyl, and butyl; phenyl; or a substituted alkyl group such as phenylmethyl, phenylbutyl, chloromethyl, methoxy, ethoxy, methylamino, hydroxyethyl, and carboxyethyl; R'" is an alkylene radical, i.e., —$C_mH_{2m}$—, containing 3 or 4 carbon atoms; R"" is hydrogen or an alkyl group containing 1–4 carbon atoms; c has a value of 2 or 3; d is zero or one; and m is 3 or 4.

Hyperbranched polymers according to this invention which are derived from a cyclic lactone include units of the formula

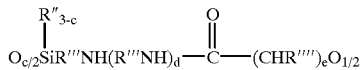

wherein R" is an alkyl group containing 1–4 carbon atoms such as methyl, ethyl, propyl, and butyl; phenyl; or a substituted alkyl group such as phenylmethyl, phenylbutyl, chloromethyl, methoxy, ethoxy, methylamino, hydroxyethyl, and carboxyethyl; R'" is an alkylene radical, i.e., —$C_mH_{2m}$—, containing 3 or 4 carbon atoms; R"" is hydrogen or an alkyl group containing 1–4 carbon atoms; c has a value of 2 or 3; d is zero or one; m is 3 or 4; and e is 2, 3, or 4.

These and other features of the invention will become apparent from a consideration of the detailed description.

DETAILED DESCRIPTION OF THE INVENTION

Figure 1:
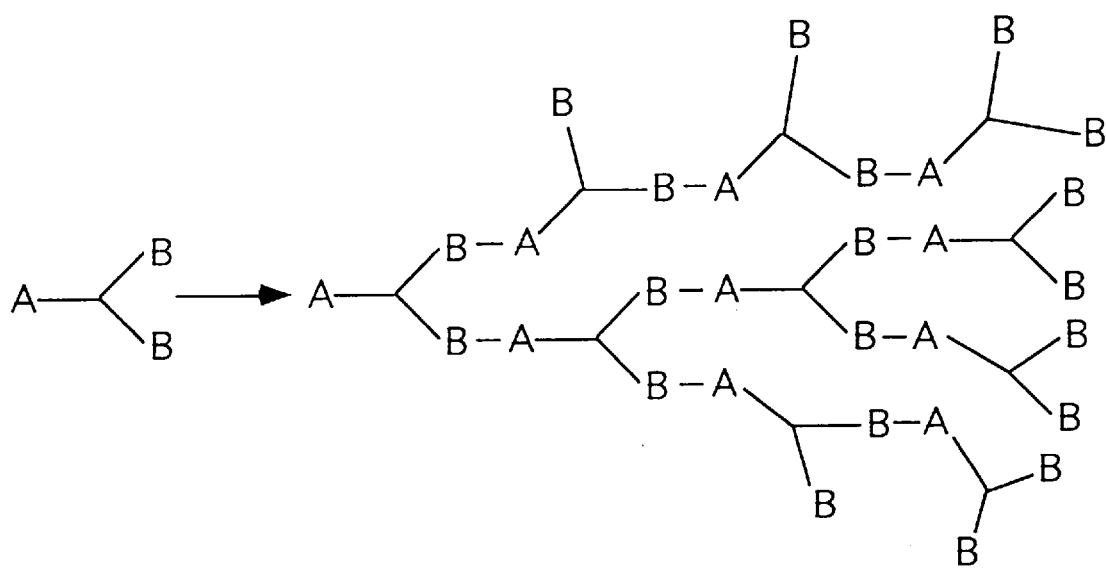
FIG. 1 is a representation of a reaction for making hyperbranched polymers in a method according to the present invention.

According to the present invention, high molecular weight hyperbranched polymers are prepared and can be rearranged to form either stable covalently linked polymer networks, or low molecular weight oligomers. Unlike the typical dendrimer, these $AB_X$ type hyperbranched polymers can be easily prepared in a one step synthesis using readily available and relatively inexpensive starting materials.

Conversion of the hyperbranched structure to stable networks, i.e., rearrangement from ≡Si—O—C linkages to an ≡Si—O—Si≡ network, occurs upon exposure to water in the presence of an acid or a base catalyst, and the hydrolysis and polycondensation of these linkages leads to a stable siloxane network. In the presence of an alcohol, hydrolysis followed by alcoholosis leads to the complete depolymerization and the formation of only low molecular weight oligomers.

The hyperbranched polymers of this invention have benefits and advantages related to the possession of a low viscosity and a high degree of functionality, even at high molecular weight. In addition, structural rearrangements are particularly useful in adhesion applications, in the resin toughening and cure of polysiloxanes where by-products are undesired, and in surface active applications such as antifoams, bio-erodibles, carrier agents, and compatibilizers.

Polymerization yielding hyperbranched polymers in accordance with this invention is based on an exchange reaction between the hydroxyl and alkoxy groups of a silane monomer. Suitable monomers as shown below contain an alcohol (hydroxyl) functionality and an alkoxy functionality attached to the silicon atom of the monomer in an appropriate ratio, and a simple exchange reaction driving off alcohol as a by-product leads to the desired hyperbranched polymerization.

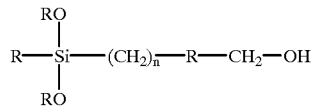

By designating the alcohol portion of this molecule as A and the silyl-alkoxy portion of the molecule as B, a monomer of this type leads to $AB_2$ type hyperbranched structures.

It is also possible to use monomers having three alkoxy groups on the central silicon atom, which upon polymerization, leads to $AB_3$ type polymeric structures, provided all alkoxy groups have reacted. Otherwise, hyperbranched structures between $AB_2$ and $AB_3$ type monomers develop.

In principle at least, it is also possible to employ monomeric silanes having several alcohol groups and only a single alkoxy group, in which case, polymerization yields $A_2B$ and $A_3B$ type structures.

Generically, suitable monomeric silanes which can be employed according to the present invention can be described as being of the type having the formula $(RO)_a R'_{(4-a-b)} SiX_b$ wherein R and R' represent an alkyl radical or an aryl radical; X represents an organic radical containing an alcohol group; and the subscripts a and b represent integers having a value from 1 to 3, provided the sum of a and b has a value greater than 2 and is equal to or less than 4.

In addition to such monomeric silanes, corresponding polysiloxanes can also be used, in which case, the number of dialkyl siloxane units, i.e., "D" units $R_2SiO_{2/2}$, in the polysiloxane is not critical, but serve as linear chains between the branches of the resulting hyperbranched products.

As an example of some suitable polysiloxanes of this type which can be employed herein, reference may be had to U.S. Pat. No. 4,883,854 (Nov. 28, 1989), for polysiloxanes prepared by a method in which amines, including aminofunctional polysiloxane fluids, are reacted with ethylene carbonate or propylene carbonate to produce hydroxy-alkyl-type urethanes. Similar polysiloxanes are also described in Kokai Patent HEI 2[1990]-47371 (Feb. 16, 1990), wherein amino-modified silicone oils are mixed with ethylene carbonate or propylene carbonate at a temperature between 40–80° C. for 1–4 hours. U.S. Pat. No. 5,290,901 (Mar. 1, 1994) may also be referred to for additional methods of preparing hydroxyl-functional polysiloxanes by reacting a cyclic silyl ether, such as 2,2,4-trimethyl-1-oxa-silacyclopentane, and a silanol. Some other suitable derivatized siloxanes, as well as derivatized silanes, which are useful herein as monomeric starting materials are taught in U.S. Pat. No. 5,174,813 (Dec. 29, 1992). These four documents are considered incorporated herein by reference.

An example of two especially preferred monomer types derived from propylene carbonate according to the present invention are shown below:

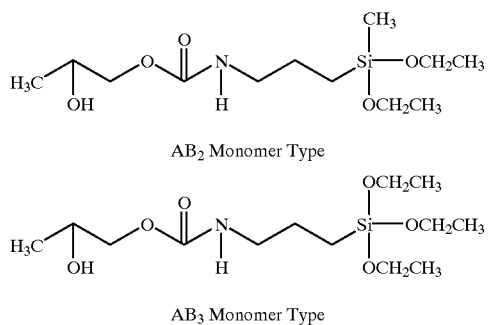

AB₂ Monomer Type

AB₃ Monomer Type

An example of two additional and especially preferred gamma-butyrolactone derived monomer types according to the present invention are shown below:

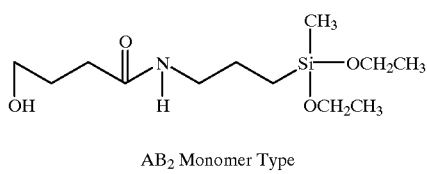

AB₂ Monomer Type

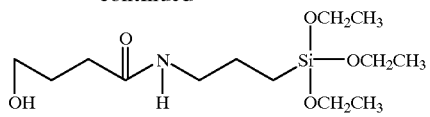

AB₃ Monomer Type

The particular type of carbinol (hydroxy) functional silane or carbinol (hydroxy) functional siloxane, as well as methods for their preparation, are not critical, provided provision is specially made to insure that alkoxy functional groups present in these monomeric species are not allowed to hydrolyze and condense forming siloxane linkages, i.e., ≡Si—O—Si≡. The term "carbinol" as used herein is intended to mean hydroxyl groups bound to carbon, i.e., ≡C—OH, as distinguished from hydroxyl groups bound to silicon, i.e., ≡Si—OH, which are "silanols".

Thus, the formation of excessive siloxane linkages leads to an irreversible gelation. Provided no self-condensation, or a very small amount, takes place, the alcohol by-product is removed from the mixture, resulting in a hyperbranched polymer of the type shown in FIG. 1. The degree of polymerization in such a reaction is directly proportional to the amount of alcohol that is removed.

EXAMPLES

The following examples are set forth in order to illustrate the present invention in more detail, including the specifics in methods for preparing hyperbranched polymers according to this invention.

Example 1

AB₃ Type Monomer

An AB₃ type monomer was prepared in a one liter 3-neck flask equipped with a thermometer, a nitrogen adapter, an air powered stirrer, and a water cooled condenser, by charging to the flask 380.3 grams (1.72 moles) of monomer precursor 3-aminopropyltriethoxysilane $H_2N(CH_2)_3Si(OCH_2CH_3)_3$, and 175.38 grams (1.72 moles) of propylene carbonate. This mixture was allowed to stir overnight with no heat under a nitrogen blanket. Upon overnight standing, the viscosity of the mixture increased. This material was checked for complete reaction of the amine groups on the aminopropyltriethoxysilane by titration of the mixture with a phenolphthalein solution. The phenolphthalein solution was mixed by dissolving 0.1 grams of phenolphthalein in 100 grams of ethanol, and mixing six milliliters of the resulting solution with one gallon (3.785 liter) of 50/50 butanol/toluene. This check revealed no basic nature to the mixture, which is indicative of complete derivatization of amino groups.

Polymerization of the thusly prepared AB₃ type monomer depicted above to a high molecular weight hyperbranched polymer was accomplished by attaching a Dean-Stark trap to the flask, and heating the contents of the flask with no catalyst to 90° C. with a nitrogen sweep. The rate of nitrogen flow was controlled with a bubbler in combination with a rubber septum over the condenser, into which a hypodermic needle was inserted. This allowed the flow of nitrogen to escape from the condenser, and ethanol was condensed and collected in the Dean-Stark trap. After two hours of heating with a nitrogen sweep, 19 milliliters of ethanol was recovered.

The resulting viscous, hyperbranched polymeric liquid was analyzed by gel permeation chromatography (GPC). The molecular weight (Mn) of the polymer was $1.378 \times 10^3$, and its polydispersity (Mw/Mn) was 2.54. Further evidence for the hyperbranched structure was derived from an analysis of the polymer by $^{29}$Si NMR and $^{13}$C NMR. The $^{29}$Si NMR spectrum revealed a four peak spectrum, indicative of unbranched, single branch, double branch, and triple branch silicon atoms, with less than one percent siloxane condensation. The $^{13}$C NMR indicated that the desired reaction had been accomplished, indicated by the appearance of a peak associated with a carbon attached to a carbonyl group, i.e., =C=O, at between 156.53 and 155.22 ppm.

Figure 2:
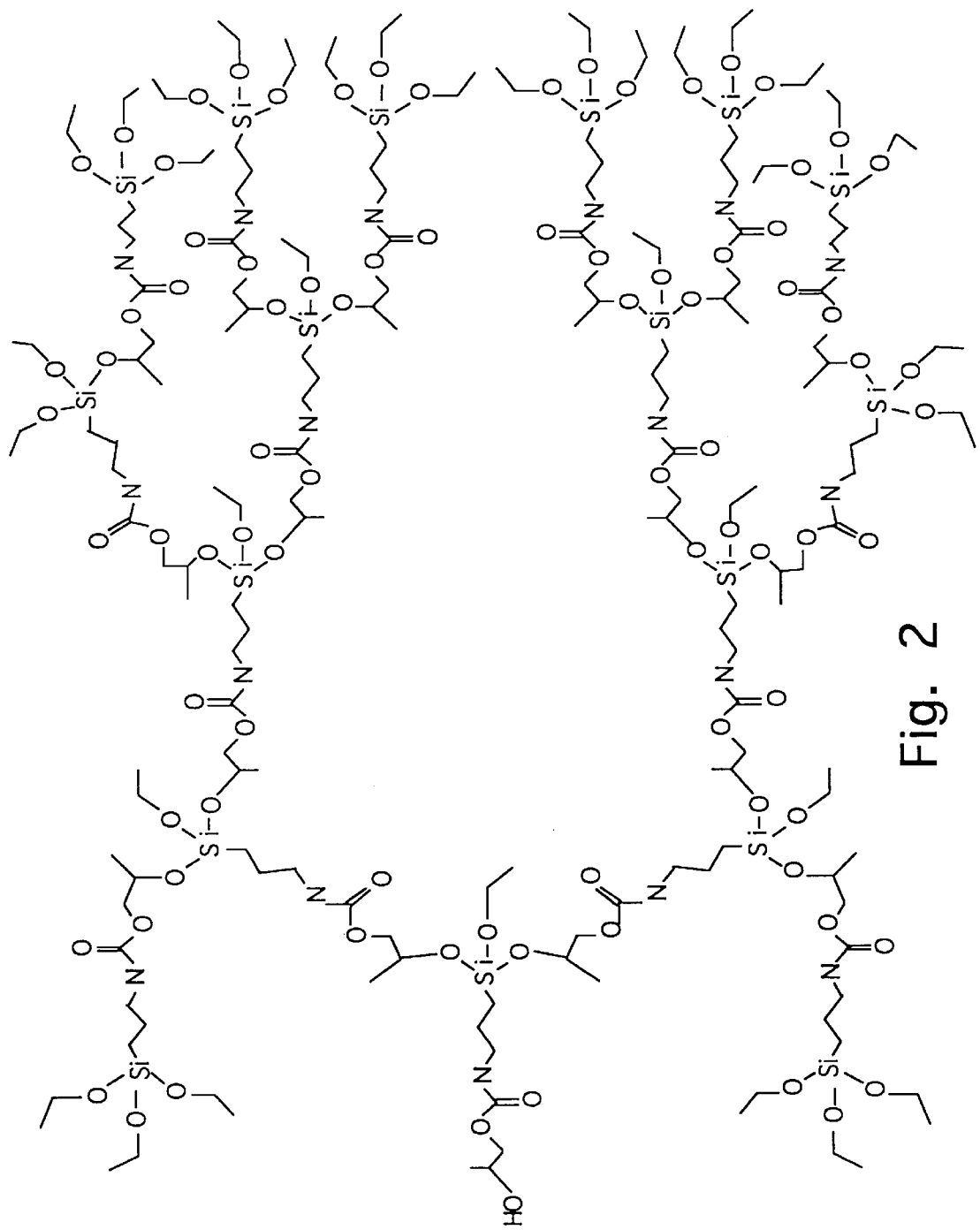
FIG. 2 is a representation of the ideal structure of an $AB_3$ hyperbranched polymer made in Example 1 in a method according to the present invention.

The polymer prepared according to this example had a structure as illustrated in FIG. 2 of the drawing.

Example 2

AB$_2$ Type Monomer

An AB$_2$ type monomer was prepared in a 500 milliliter 3-neck flask equipped with a thermometer, a nitrogen adapter, an air powered stirrer, and a water cooled condenser, by charging to the flask 40.0 grams (0.209 moles) of monomer precursor 3-aminopropylmethyldiethoxysilane H$_2$N(CH$_2$)$_3$(CH$_3$)Si(OCH$_2$CH$_3$)$_2$, and 21.34 grams (0.209 moles) of propylene carbonate. This mixture was allowed to stir overnight with no heat under a nitrogen blanket. Upon overnight standing, the viscosity of the mixture increased. This material was checked for complete derivatization of amine groups on the aminopropylmethyldiethoxysilane by titration of the mixture with the same phenolphthalein solution used in Example 1. This check revealed no basic nature to the mixture, which is indicative of complete derivatization of amino groups.

Polymerization of the resulting AB$_2$ type monomer depicted above to a high molecular weight hyperbranched polymer was accomplished by attaching a Dean-Stark trap to the flask, and heating to 90° C. with a nitrogen sweep. The rate of nitrogen flow was controlled with a bubbler in combination with a rubber septum over the condenser into which a hypodermic needle was inserted. This allowed the flow of nitrogen to escape the condenser, and ethanol was condensed and collected in the Dean-Stark trap. After heating overnight with a nitrogen sweep, 12.3 milliliters of ethanol was recovered. The high molecular weight hyperbranched polymer had a glass transition temperature $T_g$ of −30° C. and a melting point of 124° C.

Example 3

AB$_2$ Type Monomer

An AB$_2$ type monomer was prepared in a 500 milliliter 3-neck flask equipped with a thermometer, a nitrogen adapter, an air powered stirrer, and a water cooled condenser, by charging to the flask 51.21 grams (0.27 moles) of monomer precursor 3-aminopropylmethyldiethoxysilane, and 29.45 grams (0.33 moles) of ethylene carbonate. This mixture was heated to 40° C. to melt the ethylene carbonate. The heat was turned off after one hour, and the mixture was allowed to stir overnight with no heat and under a nitrogen blanket. Upon overnight standing, the viscosity of the mixture had increased, and excess of ethylene carbonate had recrystallized in the flask. The material was filtered to remove excess ethylene carbonate. This material was checked for complete derivatization of amine groups on the aminopropylmethyldiethoxysilane by titration of the mixture with the same phenolphthalein solution used in Example 1. This check revealed no basic nature to the mixture, which is indicative of complete derivatization of amino groups.

Polymerization of this AB$_2$ type monomer to a high molecular weight hyperbranched polymer was accomplished by attaching a Dean-Stark trap to the flask, and heating to 90° C. with a nitrogen sweep. The rate of nitrogen flow was controlled with a bubbler in combination with a rubber septum over the condenser, into which a hypodermic needle was inserted. This allowed the flow of nitrogen to escape the condenser, and ethanol was condensed and collected in the Dean-Stark trap. After heating overnight with a nitrogen sweep, 12.0 milliliters of ethanol had been recovered.

Figure 3:
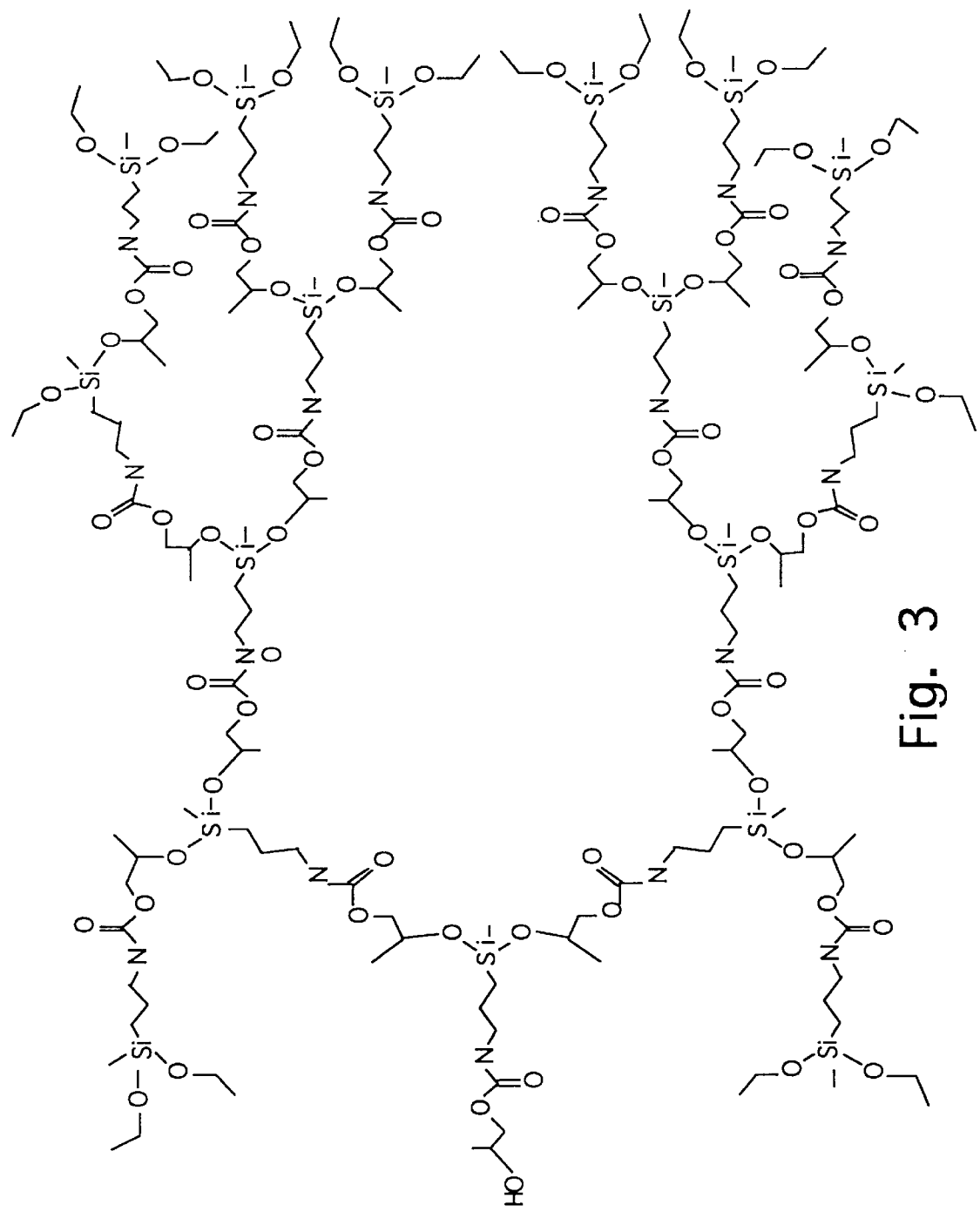
FIG. 3 is a representation of the ideal structure of an $AB_2$ hyperbranched polymer made in Examples 2 and 3 in a method according to the present invention.

The structure of AB$_2$ type polymers prepared according to Examples 2 and 3 is illustrated in FIG. 3 of the accompanying drawing.

The following additional examples are set forth in order to illustrate the present invention in more detail, including the specifics in methods for preparing hyperbranched polymers according to the second embodiment of the invention.

Example 4

AB$_3$ Type Monomer

An AB$_3$ type monomer was prepared in a one liter 3-neck flask equipped with a thermometer, a nitrogen adapter, an air powered stirrer, and a water cooled condenser, by charging to the flask 179.29 grams (1.00 mole) of monomer precursor 3-aminopropyltrimethoxysilane H$_2$N(CH$_2$)$_3$Si(OCH$_3$)$_3$, and 89.06 grams (1.00 mole) of gamma-butyrolactone. This mixture was allowed to stir overnight with no heat under a nitrogen blanket. Upon overnight standing, the viscosity of the mixture increased. This material was checked for complete reaction of the amine groups on the aminopropyltrimethoxysilane by titration of the mixture with a phenolphthalein solution. The phenolphthalein solution was mixed by dissolving 0.1 grams of phenolphthalein in 100 grams of ethanol, and mixing six milliliters of the resulting solution with one gallon (3.785 liter) of 50/50 butanol/toluene. This check revealed no basic nature to the mixture, which is indicative of complete derivatization of amino groups.

Example 5

AB$_3$ Type Polymer

A sample of 20.0 gram of the monomer prepared in Example 4 was placed in a two ounce (~60 ml) vial. The vial was sealed with a rubber septum, and dry nitrogen was bubbled through the material in the vial for four hours. Methanol and excess nitrogen was vented through a hypodermic needle inserted through the septum. The molecular weight of the resulting hyperbranched polymer was controlled by the removal of methanol.

Figure 4:
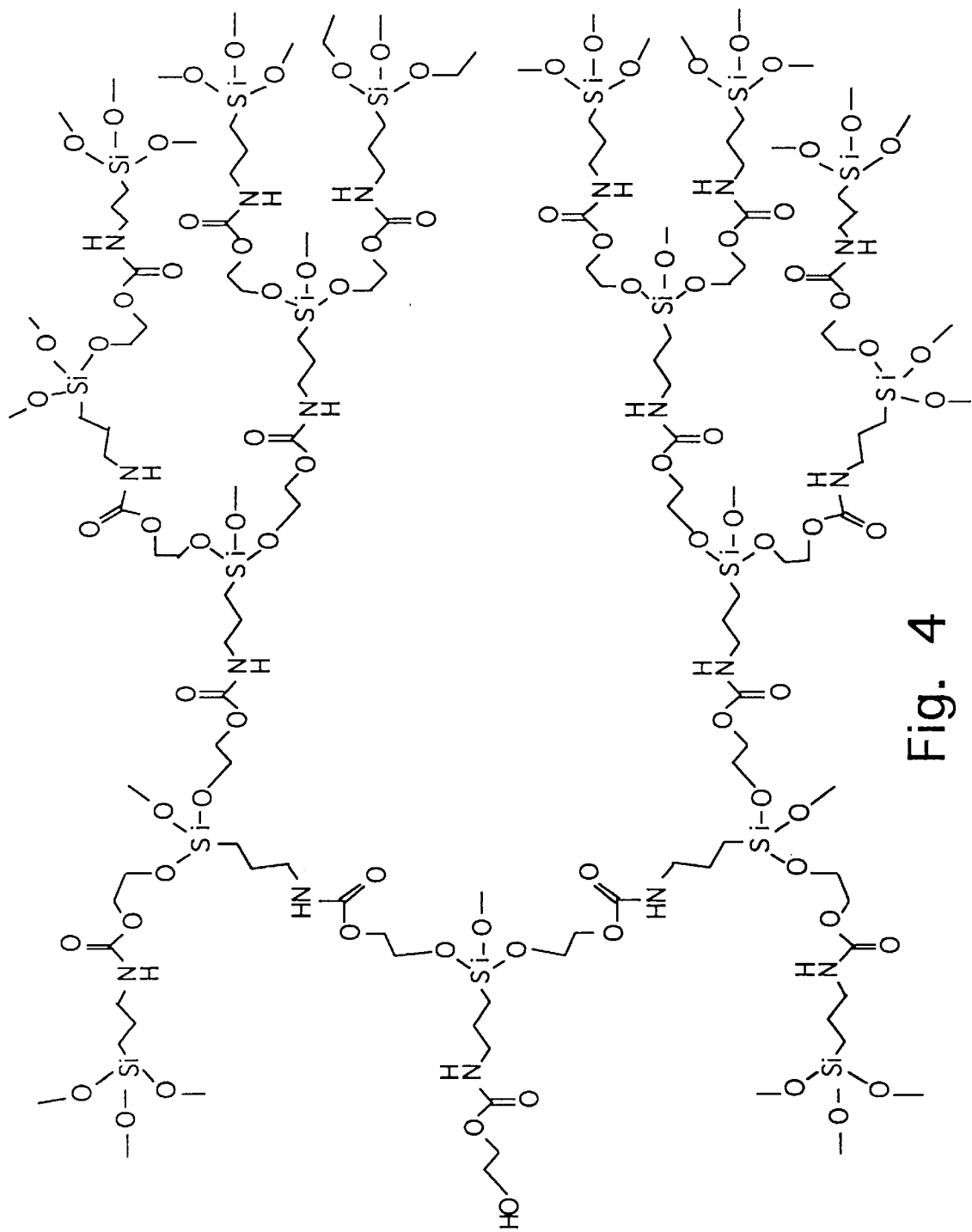
FIG. 4 is a representation of the ideal structure of an $AB_3$ hyperbranched polymer made in Example 5 in a method according to the present invention.

The polymer prepared according to this example had a structure as illustrated in FIG. 4 of the drawing.

Some other examples of monomer precursor types AB$_2$ and AB$_3$ which are useful herein according to this invention, in addition to 3-aminopropylmethyldiethoxysilane, 3-aminopropyltrimethoxysilane, and 3-aminopropyltriethoxysilane, are 4-aminobutyltriethoxysilane, 3-[2-(2-aminoethylamino)ethylamino]propyltrimethoxysilane, N-(2-aminoethyl)-3-aminoisobutylmethyldimethoxysilane, (aminoethylaminomethyl)phenethyltrimethoxysilane, N-(2-aminoethyl)-3-aminopropylmethyldimethoxysilane, N-(2-aminoethyl)-3-aminopropyltrimethoxysilane, N-(2-aminoethyl)-3-aminopropyltris(2-ethylhexoxy)silane, N-(6-aminohexyl)aminopropyltrimethoxysilane, m-aminophenyltrimethoxysilane, p-aminophenyltrimethoxysilane, and o-aminophenyltrimethoxysilane.

Other variations may be made in compounds, compositions, and methods described herein without departing from the essential features of the invention. The embodiments of the invention specifically illustrated herein are exemplary only and not intended as limitations on their scope except as defined in the appended claims.

We claim:

1. A method of making a hyperbranched polymer containing a silicon atom comprising polymerizing a derivatized aminofunctional organosilicon monomer which is made by reacting an amine functional silane monomer precursor or an amine functional polysiloxane monomer precursor with a derivative of carbonic acid.

2. A method according to claim 1 including the step of removing by-product alcohol formed during polymerization of the derivatized aminofunctional organosilicon monomer.

3. A method according to claim 1 in which the derivative of carbonic acid is ethylene carbonate or propylene carbonate.

4. A method according to claim 1 in which the amine functional silane monomer precursor is selected from the group consisting of 3-aminopropylmethyldiethoxysilane, 3-aminopropyltriethoxysilane, 4-aminobutyltriethoxysilane, 3-[2-(2-aminoethylamino)ethylamino]propyltrimethoxysilane, N-(2-aminoethyl)-3-aminoisobutylmethyldimethoxysilane, (aminoethylaminomethyl)phenethyltrimethoxysilane, N-(2-aminoethyl)-3-aminopropylmethyldimethoxysilane, N-(2-aminoethyl)-3-aminopropyltrimethoxysilane, N-(2-aminoethyl)-3-aminopropyltris(2-ethylhexoxy)silane, N-(6-aminohexyl)aminopropyltrimethoxysilane, m-aminophenyltrimethoxysilane, p-aminophenyltrimethoxysilane, o-aminophenyltrimethoxysilane, and 3-aminopropyltrimethoxysilane.

5. A method according to claim 1 in which the derivatized aminofunctional organosilicon monomer is selected from the group consisting of:

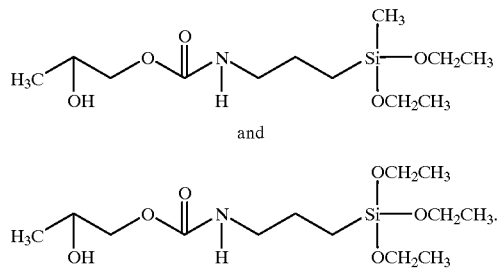

6. A hyperbranched polymer prepared according to the method defined in claim 1.

7. A method of making a hyperbranched polymer containing a silicon atom comprising polymerizing a derivatized aminofunctional organosilicon monomer which is made by reacting an amine functional silane monomer precursor or an amine functional polysiloxane monomer precursor with a cyclic lactone.

8. A method according to claim 7 including the step of removing by-product alcohol formed during polymerization of the derivatized aminofunctional organosilicon monomer.

9. A method according to claim 7 in which the cyclic lactone is beta-propiolactone, gamma-butyrolactone, gamma-valerolactone, or gamma-caprolactone.

10. A method according to claim 7 in which the amine functional silane monomer precursor is selected from the group consisting of 3-aminopropylmethyldiethoxysilane, 3-aminopropyltriethoxysilane, 4-aminobutyltriethoxysilane, 3-[2-(2-aminoethylamino)ethylamino]propyltrimethoxysilane, N-(2-aminoethyl)-3-aminoisobutylmethyldimethoxysilane, (aminoethylaminomethyl)phenethyltrimethoxysilane, N-(2-aminoethyl)-3-aminopropylmethyldimethoxysilane, N-(2-aminoethyl)-3-aminopropyltrimethoxysilane, N-(2-aminoethyl)-3-aminopropyltris(2-ethylhexoxy)silane, N-(6-aminohexyl)aminopropyltrimethoxysilane, m-aminophenyltrimethoxysilane, p-aminophenyltrimethoxysilane, o-aminophenyltrimethoxysilane, and 3-aminopropyltrimethoxysilane.

11. A method according to claim 7 in which the derivatized aminofunctional organosilicon monomer is selected from the group consisting of:

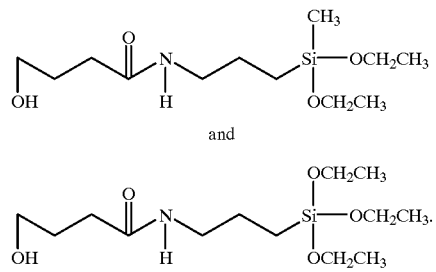

12. A hyperbranched polymer prepared according to the method defined in claim 7.

13. A hyperbranched polymer comprising units of the formula

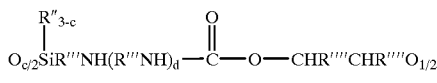

or units of the formula

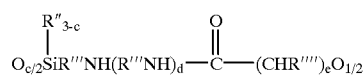

wherein R" is an alkyl group containing 1–4 carbon atoms, phenyl, or a substituted alkyl group; R'" is an alkylene radical containing 3 or 4 carbon atoms; R"" is hydrogen or an alkyl group containing 1–4 carbon atoms; c has a value of 2 or 3; d is zero or one; and e is 2, 3, or 4.

* * * * *